Feb. 10, 1942.　　　R. L. WILSON　　　2,272,872
CONTROL APPARATUS
Original Filed Aug. 25, 1939　　2 Sheets-Sheet 1

Inventor:
Rosser L. Wilson
By: Wallace and Cannon
Attorneys

Feb. 10, 1942.     R. L. WILSON     2,272,872
CONTROL APPARATUS
Original Filed Aug. 25, 1939     2 Sheets-Sheet 2

Inventor:
Rosser L. Wilson
By: Wallace and Cannon
Attorneys

Patented Feb. 10, 1942

2,272,872

UNITED STATES PATENT OFFICE 2,272,872

CONTROL APPARATUS

Rosser L. Wilson, Mahwah, N. J., assignor to The American Brake Shoe and Foundry Company, New York, N. Y., a corporation of Delaware Original application August 25, 1939, Serial No. 291,844. Divided and this application November 27, 1940, Serial No. 367,336

13 Claims. (Cl. 303—21)

This application is a division of my co-pending application Serial No. 291,844 filed August 25, 1939, now Patent No. 2,232,751, issued February 25, 1941, which is a division of my application Serial No. 213,103, filed June 10, 1938.

This invention relates to control apparatus and particularly to apparatus for controlling or otherwise affecting the braking of railway equipment and the like so as to prevent sliding of the wheels along the rails.

In the normal operation of railway equipment it is believed that there is no slippage at the points of contact of the wheels of the equipment with the rails and that the wheels roll along the rails. During a braking operation on such equipment the retarding forces effective on the wheels react at the rails to slow down the rolling movement of the wheels and so long as the adhesion between each wheel and the rail on which it rolls exceeds the retarding force effective on the wheel, the wheel is retarded without slippage at the contact thereof with the rail. It has been observed, however, where the retarding force in a braking operation exceeds the force of adhesion between a wheel and the rail on which it rolls, that the wheel slips on the rail and is thereafter retarded at a rate exceeding that at which it would have been retarded had not the slippage occurred and as a result the wheel comes to rest prematurely and thereafter slides along the rail.

There are many factors which may cause the retarding force effective on a wheel in a braking operation to exceed the adhesion between the wheel and the rail on which it rolls. For example, the braking means of railway equipment is so arranged that the friction between the elements thereof is less than what has come to be generally accepted as the usual value of the adhesion or friction between the wheel or wheels decelerated by operation of the braking means and the rail on which such wheel or wheels rolls or roll. There may be, however, an unpredictable increase in the friction between the elements of the braking means or the friction between the wheel or wheels and rail or rails may unaccountably drop below what has come to be generally accepted as the value of such friction, and of course there may be a combination of such variations. If such variation occurs in a braking operation it is quite likely that the wheel or wheels effected thereby will slip on, rather than roll on, the rail or rails whereupon, as previously explained, the wheel or wheels may prematurely stop rolling and thereafter slide along the rail or rails. Such sliding of the wheels along the rails may impair the braking operation in which it occurs and may result in serious damage such as producing so-called flats on the wheels. It will be understood that wheel sliding may be occasioned in a wide variety of ways but that however occasioned it is objectionable.

When such sliding of a wheel is about to occur in a braking operation on railway equipment, slippage of the particular wheel that is about to slide may be detected by detecting means of various types so that corrective measures may be applied before actual sliding of the wheel takes place. One such corrective measure consists in automatically rendering the associated braking means ineffective, or in otherwise reducing the effectiveness of such associated braking means when a tendency toward sliding of a wheel is detected, and after the lapse of a time period of sufficient length to enable the wheel to resume its normal rolling action, the normal action of effectiveness of the associated braking means may be reestablished, subject of course to the condition or setting of the main or conventional brake control means through which application of the braking means is primarily controlled, for the control means may be so arranged that the braking means are ineffective at the time effectiveness thereof is intended to be established, as aforesaid, in which event the braking means is merely conditioned to be operative in the next operation of the main or conventional brake control means.

Since the general mode of preventing wheel slip in railway equipment and the like involves release, or reduction of the effectiveness, of the braking means associated with the wheel or wheels in which sliding tendencies are detected, it is vitally important that the means which effects such release, or reduction of effectiveness, of the braking means be of such a nature that the braking means will not be permanently or improperly rendered ineffective or reduced in effectiveness, thereby to insure that adequate braking may be effected when required or desired, and the primary object of this invention is to insure that such vitally important functioning may be realized.

Another object is to impart an inherently safe mode of operation to that type of apparatus wherein wheel sliding is avoided by means which renders the braking means wholly or partially ineffective as to wheels where sliding is detected.

A further object is to so control apparatus of this character that the braking means will be released, or otherwise reduced in effectiveness, for no longer than a predetermined period of time.

A still further object somewhat related to the immediately foregoing objects is to so arrange the apparatus for effecting release of the braking means of railway equipment, or for otherwise reducing the retarding force established by operation of such means, that the apparatus will be rendered inoperative until manually again rendered operative in event the apparatus should fail to operate in the manner intended.

While in the foregoing discussion and in the following detailed description I refer to controlling the braking means of railway equipment, it is to be understood that my invention is not limited to control of the braking means of railway equipment for it can be employed to control braking means of other equipment on which slippage of a wheel thereof on the surface on which it normally rolls may occur, and furthermore the fundamentals underlying this invention may be employed to control a wide variety of operations in addition to braking operations and the invention may, of course, be utilized to correct wheel sliding, or a tendency toward the same, other than by affecting the braking means as by, for example, causing sand or the like to be supplied to the rail to increase the friction between the rail and the wheel or wheels riding thereon. It is, therefore, to be understood that the foregoing discussion and following detailed description pertain to preferred embodiments of my invention and such discussion and description are not to be taken as a limitation of the invention.

Other and further objects of the present invention will be apparent from the following description and claims and are illustrated in the accompanying drawings which, by way of illustration, show preferred embodiments and the principle thereof and what I now consider to be the best mode in which I have contemplated applying that principle. Other embodiments of the invention embodying the same or equivalent principles may be used and structural changes may be made as desired by those skilled in the art without departing from the present invention and the purview of the appended claims.

In accordance with the present invention, wheel slip detecting means is provided on railway equipment or the like which, upon detection of such slipping action of a wheel, operates upon the associated braking means to wholly or partially reduce the effectiveness of such braking means so that normal rolling action of the wheel may be restored, and such disabling of the braking means may continue for no longer than a predetermined period, after which the normal control or action of the braking means is reestablished so as to insure an adequate braking power.

The wheel slip detecting means may, of course, take many different forms, and in the present application three different forms are disclosed, each of which attains its detecting action by comparison of the speeds of at least two wheels of the particular piece of railway equipment to which it is applied.

Thus, in the form shown in Figs. 1 to 4, there is a switch S which includes a pair of rotors 15 and 16 respectively fast to shafts 17 and 18 journaled in suitable bearings in the switch housing 19. A gear 20 fast on the shaft 17 meshes with a gear 21 fast on the shaft 22 which is also journaled in suitable bearings in the housing 19, the gears 20 and 21 having a one-to-one ratio. The shaft 22 extends exteriorly of the housing 19 and one end of a flexible shaft 23 is connected to this end of this shaft, the other end of the flexible shaft being connected to a gear 24 that meshes with a gear 25 connected to a movable element such as the wheel FW for rotation therewith. In the present instance the gears 24 and 25 have a one-to-one ratio but this ratio may be varied as desired. Furthermore, the flexible shaft 23 could be connected to the wheel to derive motion therefrom in other ways, if so desired, as by being directly connected to the axle to which the wheel might be fast. The shaft 18 also extends exteriorly of the housing and one end of a flexible shaft 26 is connected to this end of this shaft, the other end of this flexible shaft being connected to a gear 27 that meshes with a gear 28 connected to a second relatively movable element such as the wheel RW for rotation therewith, this connection of the shaft 18 to the wheel RW being similar to connection of the shaft 17 to the wheel RW.

Figure 1:
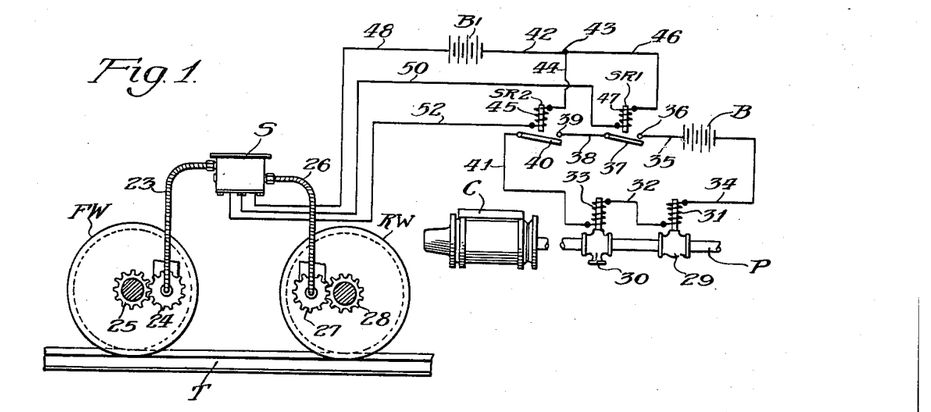
Fig. 1 is a diagrammatic view of one embodiment of my invention associated with a pair of wheels such as are provided at one side of a truck on railway equipment.

The wheels RW and FW as illustrated are to be mounted at one side of a truck (not shown) of railway equipment for movement along the rail T. These wheels are adapted to be slowed down by the usual brake apparatus (not shown) provided on railway equipment, which apparatus includes the brake cylinder C to which a fluid under pressure may be supplied through the pipe P. The brake apparatus is not additionally illustrated inasmuch as the details of the construction thereof forms no part of my invention which, in the illustrated forms, pertains to controlling the brake apparatus rather than to the construction of such apparatus per se. However, while my invention may be used with a wide variety of brake apparatus and operating means therefor, that disclosed in United States Letters Patent No. 2,068,370, patented January 19, 1937 on an application filed by Rankin J. Bush, or that disclosed in United States Letters Patent No. 2,042,112, patented May 26, 1936, to Ewing K. Lynn and Rankin J. Bush, may be considered as being illustrative. In this regard the brake cylinder 16 shown in said Bush patent corresponds to the brake cylinder C hereinabove referred to, while the brake cylinder 12 and the pipe 13 shown in said Lynn et al. patent correspond respectively to the brake cylinder C and pipe P described herein, and this is illustrative of the manner in which my invention is utilized with apparatus of this general character. The relation of my invention to the brake apparatus is apparent from the illustration of my novel control means in association with the brake cylinder C to which fluid under pressure is supplied when the wheels FW and RW are to be slowed down.

In the present instance the control apparatus is employed to control operation of a solenoid-operated check valve 29 and a solenoid-operated vent valve 30, each of which valves is positioned in the pipe P.

A conductor 32 connects one end of the winding 31 of the solenoid of the valve 29 to one end of the winding 33 of the solenoid of the valve 30. Another conductor 34 leads from the other end of the winding 31 to a source of current such as the battery B. Still another conductor 35 leads from this source of current to a contact 36 of the slow-to-release relay SR1, said contact 36 being engaged by the armature 37 of this relay during operation of the relay. A further conductor 38 leads from the armature 37 to a contact 39 of the slow-to-release relay SR2, this contact 39 being engaged by the armature 40 of the relay SR2 during operation of this relay. Yet another conductor 41 leads from the armature 40 to the end of the winding 33 opposite that to which the conductor 32 is connected. Hence, the windings 31 and 33, the armatures 37 and 40, and the contacts 36 and 39 are connected in series so that energization of the windings 31 and 33 is effected, to thereby operate the valves 29 and 30, only when both the armatures 37 and 40 are engaging the contacts 36 and 39, this occurring only when the relays SR1 and SR2 are operative simultaneously.

A conductor 42 leads from a source of current such as the battery B1 to a terminal 43. Another conductor 44 leads from the terminal 43 to one end of the winding 45 of the relay SR2 and a conductor 46 leads from the terminal 43 to one end of the winding 47 of the relay SR1. Still another conductor 48 leads from the source of current B1 to a terminal 49, Fig. 2, in the switch S. A further conductor 50 leads from the end of the winding 47 opposite that to which the conductor 46 is connected to a terminal 51 in the switch S. Yet another conductor 52 leads from the end of the winding 45 opposite that to which the conductor 44 is connected to a terminal 53 in the switch S.

Figures 2, 3, 4:
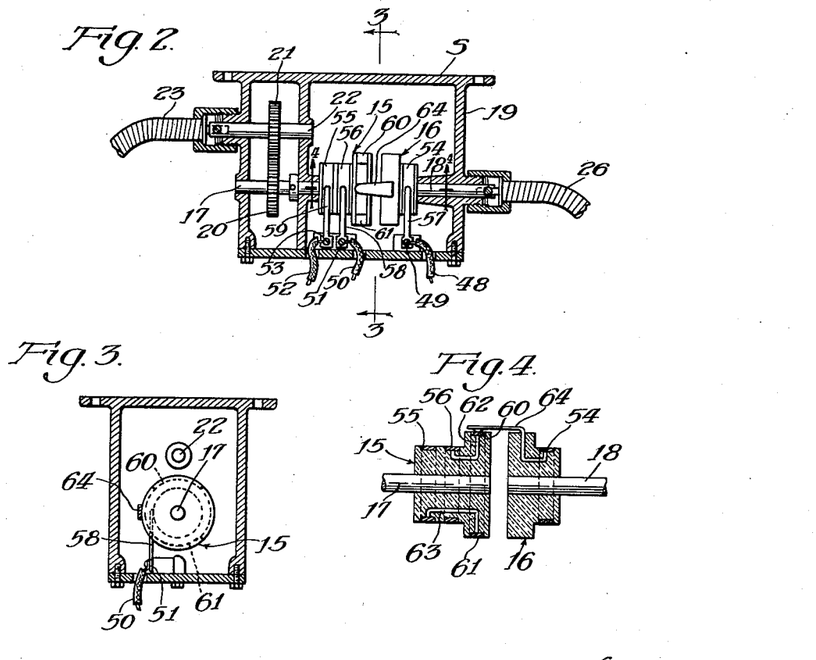
Fig. 2 is a vertical sectional view of a switching means employed in the embodiment of my invention illustrated in Fig. 1.
Fig. 3 is a transverse sectional view taken substantially on the line 3—3 on Fig. 2.
Fig. 4 is a sectional detail view taken substantially on the line 4—4 on Fig. 2.

A conductor ring 54 is mounted on the rotor 16 and a pair of conductor rings 55 and 56 is mounted in spaced relation on the rotor 15. The rotors 15 and 16 are preferably made of insulating material and hence the conductor rings 55 and 56 are insulated one from the other. A spring contact 57 mounted on the terminal 49 bears on the conductor ring 54 while spring contacts 58 and 59, respectively mounted on the terminals 51 and 53, respectively bear on the conductor rings 56 and 55. A pair of contact strips 60 and 61 is mounted in the periphery of the rotor 15 in diametrically opposite positions. These strips (see Fig. 3) each preferably extend over one-quarter of the periphery of the rotor so that the spacing between adjacent ends thereof is ninety degrees and the extent of each strip over the periphery of the rotor is ninety degrees. A conductor 62 (Fig. 4) interconnects the contact strip 60 with the conductor ring 56 while a conductor 63 connects the contact strip 61 with the conductor ring 55. A spring finger 64 is mounted in the rotor 16 in electrical connection with the conductor ring 54 and extends over that part of the periphery of the rotor 15 on which the contact strips 60 and 61 are provided so that if the rotors 15 and 16 move relative to each other the spring finger 64 alternately engages the contact strips 60 and 61. Thus, these contact strips serve as a commutator while the spring finger 64 serves as a brush.

When the spring finger or brush 64 engages the contact strip 60, circuit is established from the source of current B1 through conductor 48, spring contact 57, conductor ring 54, brush 64, contact strip 60, conductor 62, conductor ring 56, spring contact 58, conductor 50, through winding 47 and conductors 46 and 42 back to the source of current B1 whereupon the slow-to-release relay SR1 is energized. When, however, brush 64 engages the contact strip 61 circuit is established from the source of current B1 through conductor 48, spring contact 57, conductor ring 54, brush 64, contact strip 61, conductor 63, conductor ring 55, spring contact 59, conductor 52, through winding 45 back to the source of current B1 through conductors 44 and 42 whereupon the slow-to-release relay SR2 is energized.

It will be noted that the rotor 15 is connected through shaft 17, gears 20 and 21, shaft 22, flexible shaft 23 and gears 24 and 25 to the wheel FW to rotate therewith and in the same direction and also that the rotor 16 is connected through shaft 18, flexible shaft 26 and gears 27 and 28 to the wheel RW to rotate therewith and in the same direction. Hence when the wheels FW and RW are rotating the rotors 15 and 16 rotate at rates proportionate to the rates of rotation of the respective wheels, and in the present instance, by reason of the one-to-one ratio between the gears of the various sets thereof, the rotors rotate at the same speed as the wheel to which each is respectively connected. It will be recognized, however, that the rotors could be caused to rotate at greater or less speeds or rates than the wheels, it only being important that the rates of rotation of the rotors be proportionate to the rates of rotation of the wheels.

When the rotors 15 and 16 both rotate at the same rate there is no relative movement therebetween and the brush 64 rests on one or the other of the contact strips 60 and 61 or in a space between adjacent ends of these strips, such spaces being of sufficient width and the brush being sufficiently narrow that the brush cannot engage both contact strips at the same time. Of course, whenever the brush 64 engages one or the other of the contact strips 60 or 61, either the slow-to-release relay SR1 or the slow-to-release relay SR2 is energized.

In the normal operation of railway equipment it is believed that there is no slippage at the points of contact of the wheels with the rails and the wheels roll along the rails. During a braking operation effective on the wheels of such equipment the retarding forces react at the rails to slow down the rolling movement of the wheels and so long as the adhesion between each wheel and the rail on which it rolls exceeds the retarding force effective on the wheel, the wheel is retarded without slippage at the contact thereof with the rail. However, when the retarding force in a braking operation exceeds the adhesion between a wheel and the rail on which it normally rolls, the wheel slips on the rail and is thereafter retarded at a rate exceeding that at which it would have been retarded had not the slippage occurred, and as a result the wheel comes to rest prematurely and thereafter slides along the rail.

Thus, where either the rotor 15 or 16 is connected to a wheel which is retarded in the manner just described and the other rotor is connected to a wheel which continues to roll on the rail, it is apparent that the rotor connected to the wheel which is so retarded will move relative to the other rotor in relatively rapid manner whereupon the contactor or brush 64 will engage the contact strips 60 and 61 in rapid succession. The rapidity with which the brush 64 so successively engages the contact strips 60 and 61 is directly proportionate to the magnitude of the difference in the rates of rotation of the wheels. The magnitude of such difference is relatively great when only one of the wheels slips on the rail while the other continues to roll on the rail. However, it has been observed, where several wheels slip on the rails at the same time, that the wheels do not slow down uniformly, this probably being due to varying conditions at the several wheels. Hence, where both the wheels to which the rotors 15 and 16 are respectively connected slip on the rail, it is very unlikely that they will slow down uniformly and hence even in this condition there will be relative movement between the rotors 15 and 16 and the brush 64 will successively engage the contact strips 60 and 61.

As explained heretofore, the contact strips 60 and 61 and the contact brush 64 are so arranged in circuit with the slow-to-release relays SR1 and SR2 that when the brush 64 engages the contact strip or conductive segment 60 the relay SR1 is energized, and when the brush 64 engages the strip 61 the relay SR2 is energized. Each of these relays is maintained energized so long as the brush 64 remains in engagement with the contact strip in circuit with the particular relay and when, for example, the relay SR1 is energized it attracts its armature 37 which thereupon engages the contact 36. Likewise when relay SR2 is energized it attracts its armature 40 which thereupon engages the contact 39. Furthermore, each of these relays, being a slow-to-release relay, remains operative after circuit thereto is broken, that is to say, for a predetermined time after circuit to the relay is broken its armature remains in engagement with the contact engaged by the armature upon energization of the relay, this being an inherent characteristic of a slow-to-release relay.

Hence, when the brush 64 successively engages the contact strips 60 and 61 in such a way that one contact strip is disengaged and the other strip is engaged and the relay in circuit with the second of the strips so engaged is energized in a period of time less than the predetermined time, the relay in circuit with the first of said strips remains operative after circuit thereto is broken, by disengagement of the brush 64 from the contact strip in circuit therewith, then both the relays SR1 and SR2 are simultaneously operative. When this occurs both the armatures 40 and 37 are engaged with their cooperating contacts 39 and 36 and circuit is closed through the windings 31 and 33 whereupon a control operation, such as release of the braking means effecting retardation or slowing down of the wheels, is effected, as will be more fully explained presently.

It is recognized that by reason of conditions encountered in the actual use of railway equipment there will be differences in the rates of rotation of wheels even when all the wheels are normally rolling along the rails. Such differences in rates of rotation may be due to differences in the diameters of the wheels at the lines of contact thereof with the rails. In fact, there may be variations in the diameter of a single wheel at the line of contact thereof with the rail as the wheel rolls along the rail due to movement of the wheel in an axial direction. Since such conditions will exist, it is apparent that all differences in rates of rotation between wheels, to which rotors as 15 and 16 are respectively connected, should not cause these rotors to so rotate relative to each other that a control operation will be brought about. A control operation is not required unless an abnormal condition exists. To avoid a control operation unless an abnormal condition exists, provision is made to care for an extreme condition in actual operation, that is, a condition quite unlikely to be encountered, and the apparatus is so arranged that a control operation will not be effected under such extreme condition. In selecting such an extreme condition, one is chosen that will bracket other similar conditions and improper or undesired effecting of a control operation is therefore avoided.

An example of such an extreme condition is where railway equipment is operating at a speed of one hundred twenty miles per hour and the difference in diameters of the wheels to which the rotors 15 and 16 are connected is one inch at the lines of contact of such wheels with the rail or rails on which they normally roll as, for example, where the diameter of one wheel at the line of contact thereof with the rail is thirty-two inches and the diameter of the other wheel at the line of contact thereof with the rail is thirty-three inches. If a condition such as this prevailed the rotors 15 and 16 would rotate relative to each other even in normal operation and in the absence of slippage on the rail for there would be a difference in rotation therebetween of .634 revolution per second.

As explained above, each of the contact strips 60 and 61 extends over one-fourth of the circumference of the rotor 15 so that there is a ninety degree interval intermediate adjacent ends of the strips as well as a ninety degree extent of the strips. Thus, under the foregoing conditions where there is a difference of .634 revolution per second in the rotation of the rotors 15 and 16 it will require .394 second for the brush 64 to travel from the end of one contact strip 60 or 61 to the adjacent end of the other contact strip. Hence if the slow-to-release relays are timed to remain operative, after circuit thereto is broken, for less than .394 second, the armatures 37 and 44 will not be simultaneously engaged with their cooperating contacts 36 and 39 under the extreme condition mentioned above which is an operating speed of one hundred twenty miles per hour and a difference in the diameters of the wheels at the lines of contact with the rail of one inch.

It is, however, advantageous to afford a safety factor. Hence the slow-to-release relays may be timed to remain operative after circuit thereto is broken for approximately .242 second. In this circumstance, in order for the armatures 37 and 40 to be simultaneously engaged with their cooperating contacts it is necessary for there to be such relative rotation between the rotors 15 and 16 that the brush 64 will move from engagement with one of the contact strips 60 or 61 into engagement with the other of the contact strips in .242 second or less. It will be apparent that this is well beyond the time required for such successive engagement in the extreme condition described above which means that a control operation will not be brought about under normal operating conditions.

However, where slippage occurs between a wheel, to which one of the rotors 15 or 16 is connected, and the rail on which the wheel rolls, and the other wheel does not slip, or even if there is slippage between both wheels to which the rotors are respectively connected, and the rail or rails on which such wheels normally roll, there will be appreciable relative rotation between the rotors 15 and 16. Furthermore, once a wheel slips on the rail it thereafter, so far as its rotative movement is concerned, slows down rapidly and therefore almost or actually simultaneously with wheel slippage relative rotation between the rotors 15 and 16 is set up. Hence as soon as slippage occurs the brush 64 starts moving rapidly from engagement with one contact strip 60 or 61 into engagement with the other of the contact strips. Moreover as soon as the time required for the brush 64 to move from one contact strip to the other is equal to or less than .242 second, both the armatures 37 and 40 will be engaged with their cooperating contacts 36 and 39 whereupon circuit will be closed to the windings 31 and 33 to effect a control operation. Since slippage causes relatively great relative rotation between the rotors 15 and 16, the brush 64 will move from one contact strip to the other in .242 second or less practically simultaneously with the initiation of wheel slippage.

While it is necessary that simultaneous engagement of the armatures 37 and 49 with their cooperating contacts is to be avoided in normal operation, it is desirable to establish this simultaneous cooperation promptly under abnormal conditions, as when slippage occurs, and to illustrate the promptitude with which this would be brought about under abnormal conditions it is possible to effect simultaneous closing of the switches, of which the armatures 37 and 40 are a part, by only having slightly more than ninety degrees of relative rotation between the rotors 15 and 16 for the brush 64 may be near the end of one contact strip at the time rapid relative rotation between the rotors 15 and 16 is initiated and thus the brush need only move slightly more than ninety degrees to engage the other contact strip and effect simultaneous closing of the switches. It will be recognized that such movement may be effected very rapidly and from this it will be seen that the device is quite sensitive to abnormal differences in the rates of rotation between wheels as FW and RW.

To further explain the simultaneous closing of the switches, of which the armatures 37 and 40 are a part, when an abnormal condition arises as, for example, in event of wheel slippage in the course of a braking operation, if the relays SR1 and SR2 have a release time of approximately .242 second and the diameter of both the wheels FW and RW at the lines of contact thereof with the rails is approximately thirty-three inches (in this circumstance there will be no relative rotation between the rotors 15 and 16 in normal operation), a difference in the rates of rotation of the wheels equivalent to approximately six miles per hour will cause the brush 64 to move from association with one contact strip 60 or 61 into engagement with the other contact strip in approximately .242 second and in proportionately less time as the difference in the rates of rotation increases.

Since it is probable that the rotors 15 and 16 will be rotating relative to each other even in normal operation, a further example of the operation of my novel apparatus, with particular reference to the extreme condition explained above, is now set forth. In such an extreme condition, entailing the connection of the rotors 15 and 16 respectively to wheels having an inch difference in diameter, that is, where one wheel is approximately thirty-two inches in diameter at the line of contact thereof with the rail and the other wheel is approximately thirty-three inches in diameter at the line of contact thereof with the rail, there will normally be, in the absence of wheel slippage on the rail, a difference of approximately .634 revolution per second in the rates of rotation of the wheels at one hundred twenty miles per hour. This is equivalent to a speed of approximately three and three-quarters miles per hour at the circumference of a thirty-three inch wheel. Now if, in such circumstances, the smaller wheel slips on the rail so as to alter the normal difference in the rates of rotation of the wheels, a difference in the rates of rotation between the wheels equivalent to approximately a speed of nine and three-quarters miles per hour at the circumference of a thirty-three inch wheel will cause the brush 64 to move from engagement with one contact strip 60 or 61 into engagement with the other contact strip in approximately .242 second and in proportionately less time as the difference in rates of rotation increases.

From the foregoing it will be apparent that wherever the difference in the rates of rotation between wheels as FW and RW is such that the brush 64 moves from engagement with one contact strip 60 or 61 into engagement with the other strip in less than .242 second, when the relays SR1 and SR2 have a release time of .242 second, then a control operation is initiated. In the present instance the control operation entails energization of the windings 31 and 33 with the result that the check valve 29 is closed and the vent valve 30 is opened. In the course of a braking operation fluid under pressure is supplied through the pipe P to the cylinder C so long as the check valve 29 is open. Thus when in the course of a braking operation the check valve 29 is closed and vent valve 30 is opened the cylinder C is disconnected from the source of fluid under pressure by the closing of the valve 29 and is vented to the atmosphere, in the present instance, by the opening of the valve 30, this venting resulting in reduction of pressure in the cylinder and effecting release of the braking means. Of course, the arrangement could be such as to reduce the effectiveness of the braking means, rather than release thereof, if this were desired.

As soon as the braking means are released or reduced in effectiveness the retarding force effective on the wheels is removed or reduced, as the case may be, and thereupon the wheels tend to resume normal rolling along the rails. When the wheels resume normal rolling along the rails the difference in the rates of rotation therebetween becomes such that the brush 64 no longer moves from engagement with one of the contact strips 60 or 61 into engagement with the other of the contact strips in .242 second or less and therefore the switches of which the armatures 37 and 40 are a part do not remain closed with the result that circuit to the windings 31 and 33 is broken and thereupon the vent valve 30 closes and the check valve 29 opens. If the means operative to bring about the braking operation are still operating when this occurs, the braking means are again rendered effective and if the retarding forces do not again bring about a difference in the rates of rotation of the wheels there will not be such movement of the brush 64 from engagement with one contact strip 60 or 61 into engagement with the other contact strip that the windings 31 and 33 will be energized. If, however, re-application of the braking means again sets up a difference in the rates of rotation between the wheels as FW and RW such that the brush 64 moves from engagement with one of the contact strips 60 or 61 into engagement with the other strip in .242 second or less, the above described operation will be repeated.

It will be apparent from the foregoing that, since the slow-to-release relays SR1 and SR2 are simultaneously rendered operative by reason of a difference in the rates of rotation of wheels as FW and RW, a control operation can be initiated prior to the time one of the wheels prematurely stops rolling and, therefore, where the control operation results in the release of the braking means, sliding of a wheel along a rail may be avoided for when the braking means are released (or reduced in effectiveness) the wheels, being freed of a retarding force, resume normal rolling along the rail.

In the apparatus illustrated in Fig. 1, there may be such difference in the rates of rotation of wheels as FW and RW that the brush 64 will move from engagement with one contact strip 60 or 61 into engagement with the other contact strip in or less than .242 second to thereby render the relays SR1 and SR2 operative simultaneously but the difference in the rates of rotation may be such that the brush 64 will not be freed from the second of the contact strips so engaged and move back into engagement with the first of the contact strips so engaged in .242 second. In such an instance the first of the relays SR1 or SR2 to be energized might release prior to the time the brush engaged the contact strip in circuit with this particular relay and if this occurred circuit to the windings 31 and 33 would be broken. In a circumstance such as this, a condition might arise where the difference in the rates of rotation of the rotors 15 and 16 would be such that the relays SR1 and SR2 might be rendered operative simultaneously as the brush moved from engagement with one of the contact strips 60 or 61 into engagement with the other of the contact strips but such simultaneous operativeness of the relays would not be maintained until the brush moved from the second of the strips so engaged back into engagement with the first of the strips so engaged. It will be apparent that if conditions such as this arose, circuit would be alternately closed and opened through the windings 31 and 33 with the result that the valves 29 and 30 would both be rendered operative and then inoperative, alternately, which is to say, a control operation would be alternately initiated and interrupted.

Figure 5:
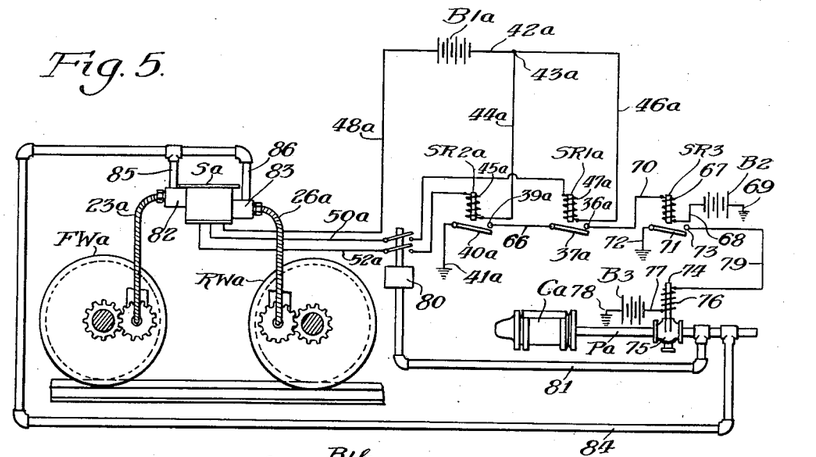
Fig. 5 is a view, similar to Fig. 1, showing another form of my invention.

In order to avoid such alternate initiation and interruption of a control operation, the apparatus may be arranged in the manner illustrated in Fig. 5 wherein rotors similar to the rotors 15 and 16 in a switch Sa are respectively connected to wheels FWa and RWa through flexible shafts 23a and 26a, the switch Sa and the flexible shafts 23a and 26a being similar to the switch S and the flexible shafts 23 and 26 and being adapted for operation in a similar manner. Furthermore, slow-to-release relays SR1a and SR2a, similar to relay SR1 and SR2, are provided as well as a source of current as the battery B1a.

In this instance a conductor 42a leads from the source of current B1a to a terminal 43a and a conductor 44a leads from the relay SR2a. Another conductor 46a leads from the terminal 43a to one end of the winding 47a of the slow-to-release relay SR1a.

As in the case of the switch S, a brush in the switch Sa, corresponding to the brush 64, is connected to the source of current B1a through a conductor 48a while a contact strip in the switch Sa, corresponding to the contact strip 60, is connected to a conductor 50a which leads to the end of the winding 47a opposite to that to which the conductor 46a is connected. Further, a contact strip in the switch Sa, corresponding to the contact strip 61 is connected to a conductor 52a which leads to the end of the winding 45a opposite that to which the conductor 44a is connected. (The switches shown in conductors 50a and 52a are explained hereinafter and for the purpose of the present description should be considered as being closed.)

Slow-to-release relay SR2a includes an armature 40a and a contact 39a and the slow-to-release relay SR1a includes an armature 37a and a contact 36a. A conductor 66 interconnects a contact 39a and the armature 37a. The armature 40a is grounded as indicated at 41a.

In the apparatus shown in Fig. 5 a third slow-to-release relay SR3 is provided which includes a winding 67, one end of which is connected to a source of current as the battery B2 through a conductor 68, said source of current being grounded at 69. The other end of said winding 67 is connected to the contact 36a through a conductor 70. The relay SR3 includes an armature 71 that is grounded as indicated at 72 and this relay also includes a contact 73 engageable by the armature 71 upon energization of the relay SR3.

A solenoid 74 is provided to control operation of the combined check and vent valve 75 provided in the pipe Pa through which fluid under pressure is supplied to the brake cylinder Ca which corresponds to the brake cylinder C. Upon energization of the solenoid 74 the valve 75 is operated to shut off supply of fluid under pressure to the brake cylinder Ca and to vent said cylinder, the valve 75 therefore performing the function of the valves 29 and 30 shown in Fig. 1.

The solenoid 74 includes a winding 76, one end of which is connected through a conductor 77 to a source of current such as the battery B3 that is grounded as indicated at 78. A conductor 79 interconnects the other end of the winding 76 to the contact 73.

In the apparatus shown in Fig. 5 when a brush in the switch Sa, corresponding to the brush 64, rests on a contact strip in the switch Sa, corresponding to the contact strip 60, circuit is closed from the source of current B1a through conductor 46a and through the switch Sa, in the manner described in the description of the switch S, to a conductor 50a and through winding 47a and conductors 46a and 42a back to the source of current B1a whereupon the slow-to-release relay SR1a is energized. When, however, a brush in the switch Sa, corresponding to the brush 64, engages a contact strip in the switch Sa, corresponding to the contact strip 61, circuit is closed from the source of current B1a through conductor 48a and through the switch Sa, in the manner described, to conductor 52a and through the winding 45a and conductors 44a and 42a back to the source of current B1a whereupon the slow-to-release relay SR2a is energized.

Energization of the relay SR1a attracts the armature 37a thereof which thereupon engages the contact 36a, this armature remaining in engagement with this contact after circuit to the winding 47a is broken for a predetermined time inasmuch as the relay SR1a is a slow-to-release relay. Thus the armature 37a engages the contact 36a so long as the relay SR1a is operative. Likewise energization of the slow-to-release relay SR2a attracts the armature 40a which thereupon engages the contact 39a, and this armature 40a remains in engagement with this contact after circuit to the winding 45a is broken for a predetermined period of time inasmuch as the relay SR2a is a slow-to-release relay. Hence the armature 40a remains in engagement with the contact 39a so long as the relay SR2a is operative.

It will be noted that engagement of the armature 37a with the contact 36a in the absence of the engagement of the armature 40a with the contact 39a does not close circuit from ground 41a through armature 40a, contact 39a, conductor 66, armature 37a, contact 36a, conductor 70, winding 67, conductor 68, battery B2 to ground 69 to effect energization of the slow-to-release relay SR3. Furthermore, the engagement of the contact 40a with the contact 39a in the absence of the engagement of the armature 37a with the contact 36a likewise does not close the just described circuit to effect energization of the slow-to-release relay SR3.

When, however, a brush in the switch Sa, corresponding to the brush 64, moves from engagement with one of the contact strips in the switch Sa, corresponding to the contact strips 60 and 61, and engages the other contact strip during the time the slow-to-release relay energized by the engagement of said brush with the first of said contact strips still has the armature thereof engaged with the cooperating contact and the relay energized by engagement of said brush with the second of the contact strips has attracted its armature into engagement with its cooperating contact, then the armature 40a will be engaging the contact 39a and the armature 37a will be engaging the contact 36a wherefore circuit to the winding 67 is closed and thereupon slow-to-release relay SR3 energizes.

The slow-to-release relay SR3 has a release time sufficiently prolonged that whenever this relay is energized it remains operative for a period sufficient to insure a control operation of not less than a predetermined period to time. Thus where, as in the present instance, the slow-to-release relay SR3 is arranged to control the supply of fluid under pressure to a brake cylinder as Ca, energization of this slow-to-release relay will initiate release of the braking means of which the cylinder Ca is a part (or will reduce the effectiveness of such braking means) and will maintain this braking means released (or reduced in effectiveness) for not less than a predetermined period of time irrespective of how long the armatures 37a and 40a remain in engagement with their cooperating contacts, this being due to the fact that energization of the slow-to-release relay SR3 initiates an operation which is not interrupted until release of the slow-to-release relay SR3. If the circuit is closed to the winding 67 of the relay SR2 for but a short time, the operation under control of the relay SR3 will proceed for a period of time equal to the time of relatively brief energization of the winding 67 plus release time of the relay SR3, and since the energization will be relatively brief the control operation will proceed for substantially the period of time represented by the release time of the relay SR3. In any event, however, the control operation will proceed for a period of time equal to the period for which the winding 67 is energized plus the release time of the relay SR3.

Therefore, by providing the relay SR3 with a release time sufficiently prolonged that a control operation of not less than a predetermined period will proceed each time the relay SR3 is energized it is possible to avoid objectionable alternate initiation and interruption of a control operation such as might result from the utilization of an arrangement such as shown in Fig. 1. Thus where the control operation is the release (or reduction in effectiveness) of the braking means of railway equipment, objectionable alternate release and application of the braking means will be avoided. Of course, even in this arrangement alternate release and application of the braking means might occur under a condition where the winding 67 was only momentarily energized and where, at the expiration of the release time of the relay SR3, both the armatures 37a and 40a would not be engaging their cooperating contacts, but wherein such engagement of the armatures would be effected shortly after release of the relay SR3 which would again result in energization of the relay SR3 and which would of course bring about another release of the braking means.

Release of the braking means by the arrangement illustrated in Fig. 5 is effected whenever the relay SR3 is operative for when this relay is operative the armature 71 thereof is engaged with the contact 73 whereupon circuit is closed from the ground at 72, through armature 71, contact 73, conductor 79, winding 76, conductor 77, battery B3 to ground at 78, which energizes the solenoid 74 and operates the valve 75 to close off the supply of fluid under pressure to the brake cylinder Ca and vent this cylinder to the atmosphere.

It has been explained heretofore that there may be relative movement between rotors as 15 and 16 even in normal operation of railway equipment and it has also been explained that whenever a brush such as the brush 64 is in engagement with a contact strip as the contact strips 60 and 61 the slow-to-release relay in circuit with the contact strip so engaged by the brush will be energized. However, where this apparatus is employed to prevent wheel sliding in the course of a braking operation by either releasing the braking means operative during such a braking operation or reducing the retarding forces established by operation of the braking means, the device may be arranged to prevent energization of the slow-to-release relays except during a braking operation by providing a control device such as the switch 80, Fig. 5. In the present instance the switch 80 is pressure-responsive and is connected to the pipe Pa through a pipe 81 ahead of the valve 75 so that so long as there is fluid under pressure in the pipe Pa (which condition will prevail so long as a braking operation is in progress) the switch 80 will be closed. The switch 80, as shown, may be conveniently arranged in the conductors 50a and 52a to thereby disconnect spring contacts as 58 and 59 from relays as SR1a and SR2a so long as the switch 80 was opened, which condition would prevail until fluid under pressure was supplied through the pipe Pa to the brake cylinder Ca during a braking operation. Hence, the relays as SR1a and SR2a could only be energized when a braking operation was in progress which, in the present arrangement, is the only time such relays need be energized.

There might also be conditions where it would be desirable to interrupt relative rotation between rotors as 15 and 16, except when these rotors were to be utilized to effect a control operation, as where the control operation brought about by predetermined operation of the rotors 15 and 16 relative to each other is the release of braking means or the reduction of the retarding force established by operation of such means, the rotors would be rendered operative only when a braking operation is in progress. To this end a fluid-responsive clutch 82 would be interposed between the flexible shaft as 23a and a shaft corresponding to the shaft 22, and another fluid-responsive clutch 83 would be interposed between the flexible shaft as 26a and the shaft as 18. A pipe as 84 connected to the pipe Pa ahead of the valve 75 leads to the clutch 82 through a branch pipe 85 and to the clutch 83 through a branch pipe 86 so that whenever fluid under pressure is supplied to the brake cylinder as Ca through a pipe as Pa the clutches 82 and 83 are engaged to thereby connect a rotor as 15 with a flexible shaft as 23a and a rotor as 16 with a flexible shaft as 26a.

As will be apparent to those skilled in the art, a switch such as the switch 80 may be employed with or without clutches as 82 and 83 and likewise clutches as 82 and 83 could be employed with or without a switch as 80, the use of these devices being dictated by the conditions under which my novel apparatus is used.

Figures 6, 7:
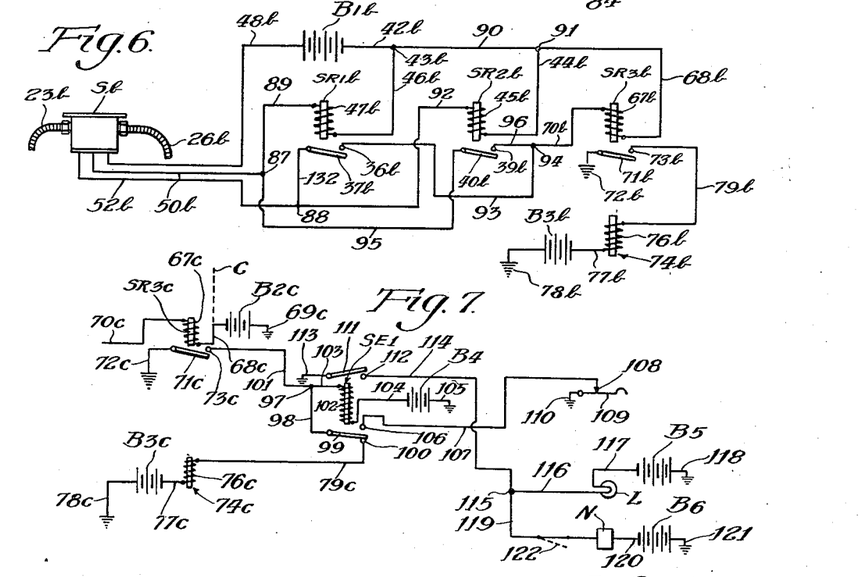
Fig. 6 is a diagrammatic view of a modification of the form of the invention shown in Fig. 5.
Fig. 7 is a diagrammatic view of a still further modified form of the invention shown in Fig. 5.

A further modified form of control apparatus is shown in Fig. 6 and herein a switch Sb is provided which is similar to the switch S and which includes rotors that in the present instance may be operated at rates proportionate to the rates of rotation of wheels of railway equipment through flexible shafts as 23b and 26b that correspond to the shafts 23 and 26.

A source of current B1b is provided and a conductor 48b leads from this source of current to a terminal in the switch Sb corresponding to the terminal 49 in the switch S. Conductors 50b and 52b respectively lead from terminals in the switch Sb corresponding to the terminals 51 and 53 in the switch S. The conductor 50b leads to a terminal 87 while the conductor 52b leads to a terminal 88. Three slow-to-release relays SR1b, SR2b and SR3b are provided.

A conductor 42b leads from the source of current as the battery B1b to a terminal 43b and a conductor 46b leads from the terminal 43b to one end of the winding 47b of slow-to-release relay SR1b, a conductor 89 connecting the other end of this winding to the terminal 87. A conductor 90 leads from terminal 43b to a terminal 91 and a conductor 44b leads from the terminal 91 to one end of the winding 45b of the slow-to-release relay SR2b, a conductor 92 leading from the other end of this winding to the terminal 88. A conductor 132 interconnects the armature 37b with the terminal 88. A conductor 93 leads from the contact 36b to a terminal 94. A conductor 95 interconnects the armature 40b with the terminal 87 while a conductor 96 interconnects the contact 39b with the terminal 94. A conductor 70b leads from the terminal 94 to one end of the winding 67b of the slow-to-release relay SR3b and a conductor 68b leads from the other end of this winding to the terminal 91. The armature 71b of the relay SR3b is grounded as indicated at 72b while the contact 73b is connected through a conductor 79b to one end of the winding 76b of a solenoid 74b, the other end of this winding being connected through a conductor 77b to a source of current as the battery B3b which is grounded as at 78b.

So long as the slow-to-release relays SR1b, SR2b and SR3b are operative the armatures 37b, 40b and 71b are respectively engaged with the contacts 36b, 39b and 73b.

In the switch Sb there is a brush similar to the brush 64 and contact strips similar to the contact strips 60 and 61. When this brush engages a contact strip similar to the contact strip 60 circuit is closed from the conductor 48b to the conductor 50b and when this brush engages a contact strip similar to the contact strip 61, circuit is closed from the conductor 48b to the conductor 52b.

When circuit is closed from the source of current as the battery B1b through conductor 48b, switch Sb, conductor 50b to terminal 87, and through conductor 89, winding 47b and conductors 46b and 42b back to the source of current B1b, the slow-to-release relay SR1b is energized and the armature 37b thereof is engaged with the contact 36b. In normal operation this does not close circuit to the winding 67b since circuit to the conductor 52b is not closed at the same time circuit to the conductor 50b is closed and, therefore, the engagement of the armature 37b with the contact 36b does not close circuit from terminal 88 through conductor 132, armature 37b, contact 36b, conductor 93 to terminal 94. While closing of circuit to conductor 50b also closes circuit to conductor 95, circuit is not closed through armature 40b, contact 39b and conductor 96 to terminal 94 unless relay SR2b is operative to engage armature 40b with contact 39b.

When circuit is closed to conductor 52b, it is also closed to terminal 88 and in normal operation this does not close circuit through conductor 132, armature 37b, contact 36b and conductor 93 to terminal 94 for at this time armature 37b will be disengaged from contact 36b. However, closing of circuit to conductor 52b also closes circuit to conductor 92 and through winding 45b, conductors 44b, 90 and 42b, circuit is closed back to the source of current B1b whereupon the winding 45b of relay SR2b is energized and the armature 40b is engaged with the contact 39b.

In the operation of the device when the brush in the switch Sb corresponding to the brush 64 in the switch S moves from engagement with one contact strip in the switch Sb, similar to one of the contact strips 60 or 61, into engagement with the other contact strip in the switch Sb, similar to the contact strips 60 or 61, as the case may be, in a period of time such that the slow-to-release relay in circuit with the first of the so engaged strips is still operative at the time the brush engages the other of the contact strips, circuit will be closed to the terminal 94.

Thus, if the slow-to-release relay SR1b were the first of the two relays to be energized and is the one which remains operative, then the armature 37b thereof is engaging the contact 36b wherefore when the brush engages the one of the contact strips that closes circuit to conductor 52b, circuit will be closed from terminal 88 through conductor 132, armature 37b, contact 36b and conductor 93 to terminal 94. At this same time the winding 45b will be energized to engage the armature 40b with the contact 39b and if, therefore, the brush similar to the brush 64 moves from engagement with the second of the contact strips to be engaged into engagement with the first of the contact strips to be engaged prior to the time the relay SR2b releases, flow of current to the terminal 94 will be established from terminal 87, through conductor 95, armature 40b, contact 39b and conductor 96.

In either event it will be noted that when both the slow-to-release relays SR1b and SR2b are operative circuit is closed to the terminal 94 from the source of current B1b through conductor 48b and switch Sb and either through conductor 50b, terminal 87, conductor 95, armature 40b, contact 39b and conductor 96 or through conductor 52b, terminal 88, conductor 132, armature 37b, contact 36b and conductor 93. From terminal 94 circuit is closed through conductor 70b, winding 67b and conductors 68b, 93 and 42b back to the source of current B1b whereupon the slow-to-release relay SR3b is rendered operative to attract its armature 71b into engagement with the contact 73b whereupon circuit is closed through the winding 76b of the solenoid 74b from ground at 72b through armature 71b, contact 73b, conductor 79b, winding 76b and conductor 77b to the source of current as the battery B3b and to ground at 78b. This energizes the winding of the solenoid 74b which may be arranged to operate a combined vent and check valve similar to the combined vent and check valve 75, Fig. 5, and thereafter a control operation will proceed in the manner described in connection with the description of Fig. 5.

The arrangement shown in Fig. 6 is quite similar to that shown in Fig. 5 but has an advantage over the arrangement shown in Fig. 5 in that the relay SR3b starts to energize as soon as a brush similar to the brush 64 engages a second contact strip, while the slow-to-release relay, energized by engagement of the brush with the first of the strips, is still operative, whereas in the arrangement shown in Fig. 5 it is necessary that the relay in circuit with the second of the strips so engaged be energized before circuit to slow-to-release relay SR3 is closed. In other respects the arrangements shown in Figs. 5 and 6 operate in an identical manner.

In accordance with the present invention the use of wheel slip detecting means and its associated control apparatus, such as that disclosed in Figs. 1 to 6 hereof, to render braking means wholly or partially ineffective when wheel slip is detected, is rendered safe under all conditions through the provision of means which permits normal operation of such apparatus for periods sufficient in ordinary instances to reestablish normal rolling of the wheels, and which acts to insure normal operation or effectiveness of the braking means after the expiration of such a normal period of operation of such control apparatus. Thus the present invention insures adequate braking power for required or desired braking operations. To this end the apparatus illustrated in Fig. 7 of the drawings is associated with a control means such as the wheel slip detecting means and the associated control apparatus of either Fig. 5 or Fig. 6 to insure that the braking means there shown will invariably be restored to its normal operative state after a predetermined period of release or reduced effectiveness. If used with the arrangement shown in Fig. 5, the conductor 70c, Fig. 7, would lead from a contact corresponding to the contact 36a to winding 67c and through conductor 68c and battery B2c to ground at 69c. If used with the arrangement shown in Fig. 6, the conductor 70c would lead from a terminal corresponding to the terminal 94, Fig. 6, through winding 67c, conductor 68c and the conductor shown in broken lines and indicated by C in Fig. 7 to a terminal corresponding to the terminal 91 and in this instance conductor 68c would not be connected to a source of current as B2c as shown in full line in Fig. 7. Thus in the arrangement shown in Fig. 7 the slow-to-release relay SR3b is energized whenever an abnormal condition exists and the energization of this relay engages the armature 71c with the contact 73c to ground the conductor 101.

In the present instance the conductor 101 leads to a terminal 97 and when conductor 101 is grounded circuit is closed through a conductor 98, armature 99, contact 100, conductor 79c, winding 76c, conductor 77c, through the source of current B3c to ground at 78c. The winding 76c is part of a solenoid 74c which corresponds to, is for the same purpose as, and operated in the same manner as the solenoids 74 and 74b.

If in the operation of the arrangement shown in Fig. 7 the solenoid 74c is maintained operative for more than a predetermined period of time, then circuit thereto is broken. The predetermined period of time for which the solenoid 74c may continue to be operative will be of sufficient length to enable an intended control operation to be completed. Such a control operation, as explained above, may be release of braking means or a reduction in the effectiveness of such means. When, however, operation of the solenoid 74c is not interrupted at the end of such predetermined period of time, the control operation should nevertheless be interrupted because this will be indicative of an inadvertent and improper condition. To this end a slow-to-energize relay SE1 is provided and the aforesaid armature 99 and contact 100 are a part of this relay.

The slow-to-energize relay SE1 includes a winding 102, one end of which is connected to the terminal 97 through a conductor 103, the other end of this winding being connected to a source of current as the battery B4 through a conductor 104, said battery being grounded at 105. The slow-to-energize relay SE1 is such that the armature 99 thereof is not attracted from engagement with the contact 100 into engagement with the contact 106 until a predetermined time after circuit to the winding 102 of this relay has been closed by the engagement of armature 71c with contact 73c.

Thus, when the armature 71c is engaged with the contact 73c to apply ground on the winding 76c and thereby render the solenoid 74c operative, circuit is also closed from ground at 72c through armature 71c, contact 73c, conductor 101, terminal 97 and thence through conductor 103, winding 102 and conductor 104 to battery B4 and ground at 105. This energizes winding 102 but the armature 99 of the relay SE1 is not attracted until circuit has been closed through the winding 102 for a predetermined time. When, however, circuit remains closed through the winding 102 for a predetermined period of time, the armature 99 is attracted from engagement with the contact 100 into engagement with the contact 106 and thereupon circuit is closed from ground at 105 through the source of current B4, conductor 104, winding 102, conductor 103, terminal 97, conductor 98, armature 99, contact 106, conductor 107 to fixed contact 108 and through movable contact 109 to ground at 110 whereby a stick or holding circuit is closed through winding 102 to maintain the relay SE1 energized.

Such disengagement of armature 99 from contact 100 breaks circuit to winding 76c wherefore the solenoid 74c is rendered inoperative. The solenoid 74c will remain inoperative and no further control operations will be effected until the stick circuit through winding 102 is broken. This stick circuit can only be broken by manually disengaging the movable contact 109 from the fixed contact 108 and this will not be done until the reason why circuit remained closed to the winding 76c for greater than a predetermined period of time has been ascertained. Thus by the arrangement shown in Fig. 7 my device may be rendered inoperative until manually rendered operative and this will occur whenever a control operation is prolonged for greater than a predetermined period of time.

Obviously it will be advantageous to indicate the disengagement of the armature 99 from the contact 100 and the engagement thereof with the contact 106. Hence the slow-to-energize relay SE1 is provided with another armature 111 that is adapted to engage the contact 112 simultaneously with the engagement of the armature 99 with the contact 106. The armature 111 is grounded as indicated at 113 and a conductor 114 leads from the contact 112 to a terminal 115. Thus circuit is closed to terminal 115 each time a stick circuit is closed for relay SE1.

A circuit from ground is closed from the terminal 115 through conductor 116, a visible signal such as the lamp L and conductor 117 to a source of current as the battery B5 each time terminal 115 is grounded by the engagement of armature 111 with contact 112, said source of current B5 being grounded at 118. A conductor 119 leads from the terminal 115 to an audible signal such as the buzzer N which is connected to a source of current as the battery B6 through a conductor 120, said battery being grounded as indicated at 121. Thus the buzzer N is rendered operative each time terminal 115 is grounded.

Thus the visible signal L and the audible signal N are rendered operative whenever the solenoid 74c is rendered inoperative by the disengagement of the armature 99 from the contact 100. While it may be advantageous to maintain both the audible signal N and the visible signal L operative once circuit thereto is closed, there may be circumstances where it will be desirable to interrupt circuit to one or the other of both of these signals and to this end a manually operable switch may be provided for this purpose, such a switch being indicated at 122 and being provided in the conductor 119 to enable the audible signal N to be rendered inoperative by the manual opening of this switch. Of course, a similar switch could be provided in the conductor 116 to render the visible signal L inoperative or such a switch could be provided in the conductor 114 so that both of the signals could be rendered inoperative, if desired.

From the foregoing description it will be evident that the present invention enables sliding of the wheels of railway equipment or the like to be prevented by variation or reduction of the effectiveness of the braking means, while insuring adequate braking power at all times.

It is also to be understood that visible signals, such as the lamp L, Fig. 7, or audible signals, such as the buzzer N, Fig. 7, could be associated with each of the various arrangements illustrated to indicate that a control operation is in progress. It will be recognized that either or both of such signals could be employed and that such signals could be located in any desired position.

It will likewise be apparent that the provision of means such as the slow-to-energize relay SE1, Fig. 7, affords a safety factor for, if a control operation should not be effected in the manner intended, such a relay could be arranged, as is the relay SE1, to prevent a further control operation being effected until the devices effectuating the control operation had been manually rendered operative as by separating a movable contact as 109 from a fixed contact as 108.

My invention has been described with particular reference to preventing wheel sliding in event of slippage of a wheel of railway equipment on the rail on which it normally rolls. However, it is to be understood that my invention is susceptible of use to bring about a control operation wherever parts capable of movement relative to each other are provided.

Furthermore, in describing my invention I have referred to releasing the braking means effective to decelerate wheels with which my apparatus is used and I have also referred to reducing the effectiveness of such braking means in the sense that the braking means are not entirely released but it will be appreciated that the effect is the same in either instance for if the braking means are released they are, by that fact, reduced in effectiveness, which is to say, reduced in retarding effect.

Hence while I have illustrated and described selected embodiments of my invention it is to be understood that these are capable of variation and modification and I, therefore, do not wish to be limited to the precise details set forth but desire to avail myself of such changes and alterations as fall within the scope of the following claims.

I claim:

1. Vehicle brake control apparatus comprising, in combination, means operatively responsive to slipping of a vehicle wheel, means controlled by the wheel-slip responsive means for automatically effecting a release of the brakes associated with the wheel when the wheel begins to slip and effective thereafter, in its normal manner of operation, to initiate the reapplication of the brakes on the wheel, and means automatically effective to initiate reapplication of the brakes on the wheel in the event that the last said means fails to initiate reapplication with a predetermined length of time.

2. Vehicle brake control apparatus for use with at least two wheels and comprising, in combination, means operatively responsive only to the changes in the relative rotative speed of the wheels, means controlled by the last said means for automatically effecting release of the brakes associated with the wheels when a wheel begins to slip and effective thereafter, in its normal manner of operation, to initiate reapplication of the brakes on the wheel, and means automatically effective to initiate reapplication of the brakes on the wheel in the event of failure of the last said means to initiate reapplication of the brakes within a predetermined length of time.

3. In a vehicle brake control apparatus, wheel-slip detecting means operable to detect slipping of a vehicle wheel of railway equipment or the like when such a wheel is being decelerated by application of braking means thereto, control means governed by said wheel-slip detecting means and operable automatically in response to the detection thereby of such wheel slipping to reduce the effectiveness of the associated braking means, said control means being operative normally to maintain such reduced effectiveness of the associated braking means for a period sufficient to enable normal rolling of the wheel to be resumed, and safety governing means operable automatically, when said control means has operated for more than a predetermined time, to restore the effectiveness of the braking means independently of the condition of said control means.

4. In a vehicle brake control apparatus, wheel-slip detecting means operable to detect slipping of a vehicle wheel of railway equipment or the like when such a wheel is being decelerated by application of braking means thereto, control means governed by said wheel-slip detecting means and operable automatically in response to the detection thereby of such wheel slipping to reduce the effectiveness of the associated braking means, said control means being operative normally to maintain such reduced effectiveness of the associated braking means for a period sufficient to enable normal rolling of the wheel to be resumed, and safety governing means operable automatically to disable said control means when said control means operates for more than a predetermined time.

5. In a vehicle brake control apparatus, means operatively responsive to slipping of a vehicle wheel when such a wheel is being decelerated through the application of braking means thereto to detect slipping of such vehicle wheel, control means governed by said wheel-slip responsive means for effecting a rapid release of the brakes associated with the wheel when slipping of the wheel is detected, said control means being operative for at least a predetermined period once it has been operated to effect such rapid release of the brakes and being thereafter effective to initiate reapplication of brakes on the wheel, and means automatically effective in the event that such automatic reapplication is not initiated to render said control means ineffective.

6. In an apparatus which includes means for reducing the retarding effect of the braking means of railway equipment or the like under control of relative movement of at least two wheels on such equipment at least one of which is decelerated by such braking means, at least two devices each having a part adapted for cooperation with a corresponding part on at least one other of the devices for rendering the reducing means operative when such parts are rendered operative simultaneously, a plurality of members adapted to be separately driven one by each of said wheels in such a ratio that said members operate substantially in synchronism when a desired speed relation exists between the wheels, said members being operatively associated with said devices to render said devices operative successively when said members are operating in such substantial synchronism and to render at least two of said devices operative simultaneously when said members are not operating in such substantial synchronism whereby the parts of said last-named devices cooperate to render the reducing means effective, at least one of said devices being constituted and arranged to remain operative after said members have ceased to be effective thereon to render it operative whereby this and another of said devices operate simultaneously to effect operation of said reducing means when the relative movement between said wheels and therefore said members is such that said members render at least one of the devices operative at a time when a device which remains operative after the members have ceased to be effective thereon is still operative, means for maintaining the reducing means operative for at least a predetermined period of time once such means has been rendered operative, and means for rendering the reducing means unresponsive to the devices controlling operation thereof when such means are maintained operative for longer than said predetermined period of time.

7. In an apparatus which includes means for reducing the retarding effect of the braking means of railway equipment or the like under control of relative movement of at least two wheels on such equipment decelerated by such braking means, detecting means including at least two parts respectively movable at speeds proportionate to the speeds of the respective wheels, at least two devices each having a part adapted for cooperation with a corresponding part on at least one other of the devices for rendering the reducing means operative when the devices are operative simultaneously, means through which the detecting means are effective to render said devices operative successively upon relative movement between said wheels and the parts respectively movable with the wheels, at least one of said devices remaining operative for a predetermined period of time after the detecting means has ceased to be effective thereon to render it operative whereby the devices are operative simultaneously when the relative movement between said parts of the detecting means is such that the detecting means renders at least one of said devices operative at a time when a device which remains operative after the detecting means has ceased to be effective thereon is still operative, means for maintaining the reducing means operative for at least a predetermined period of time once such means has been rendered operative, and means for rendering the reducing means unresponsive to the devices controlling operation thereof when such means are maintained operative for longer than said predetermined period of time.

8. In an apparatus which includes means for reducing the retarding effect of the braking means of railway equipment or the like under control of relative movement of at least two wheels on such equipment decelerated by such braking means, electrical means for operating the reducing means, detecting means including at least two parts respectively movable at speeds proportionate to the speeds of the respective wheels, at least two relays for effecting current flow to said electrical means when the relays are operative simultaneously, spaced contact means on one of said parts, second contact means on another of said parts, circuit means interconnecting said relays and said contact means and through which at least one of said relays is energized to be rendered operative when the second contact means engages one of the spaced contact means and through which at least one other of the relays is energized to be rendered operative when the second contact means engages another of the spaced contact means, at least one of said relays being a slow-to-release relay whereby the relays are operative simultaneously to effect operation of the reducing means when the relative movement between said parts of the detecting means is such that the second contact means moves from engagement with the spaced contact means that is engaged thereby to render a slow-to-release relay operative and moves into engagement with another of the spaced contact means to render another of said relays operative in a period of time less than the release time of the previously energized slow-to-release relay, means for maintaining the reducing means operative for at least a predetermined period of time once such means has been rendered operative, and means for rendering the reducing means unresponsive to the relays when such means are maintained operative for longer than said predetermined period of time.

9. In an apparatus which includes means for reducing the retarding effect of the braking means of railway equipment or the like under control of relative movement of at least two wheels on such equipment decelerated by such braking means, electrical means for operating the reducing means, detecting means including at least two parts respectively movable at speeds proportionate to the speeds of the respective wheels, at least two relays for effecting current flow to said electrical means when the relays are operative simultaneously, spaced contact means on one of said parts, second contact means on another of said parts, circuit means interconnecting said relays and said contact means and through which at least one of said relays is energized to be rendered operative when the second contact means engages one of the spaced contact means and through which at least one other of the relays is energized to be rendered operative when the second contact means engages another of the spaced contact means, at least one of said relays being a slow-to-release relay whereby the relays are operative simultaneously to effect operation of the reducing means when the relative movement between said parts of the detecting means is such that the second contact means moves from engagement with the spaced contact means that is engaged thereby to render a slow-to-release relay operative and moves into engagement with another of the spaced contact means to render another of said relays operative in a period of time less than the release time of the previously energized slow-to-release relay, a slow-to-release relay in the circuit means for maintaining the reducing means operative for at least a predetermined period of time once such means has been rendered operative, a slow-to-energize relay in the circuit means for rendering the reducing means unresponsive to the relays when such means are maintained operative for longer than said predetermined period of time, and means for maintaining the slow-to-energize relay energized once it is energized and including a manually operable switch, the last-named means maintaining the slow-to-energize relay energized until said switch is manually operated.

10. Vehicle brake control apparatus comprising, in combination, means for effecting the application and release of the brakes associated with the wheels of the vehicle, means operatively responsive to slipping of a vehicle wheel, means controlled by the wheel-slip responsive means for automatically effecting a rapid release of the brakes associated with the wheel when the wheel begins to slip and effective thereafter, in its normal manner of operation, to initiate the reapplication of the brakes on the wheel within a certain length of time following the instant the wheels begin to slip, and means automatically effective to initiate reapplication of the brakes on the wheel in the event that the last said means fails to initiate reapplication within said certain length of time.

11. Vehicle brake control apparatus for use with at least two wheels and comprising, in combination, means for effecting the application and release of the brakes associated with the wheels of the vehicle, means operatively responsive only to the changes in the relative rotative speed of the wheels, means controlled by the last said means for automatically effecting release of the brakes associated with the wheels when a wheel begins to slip and effective thereafter, in its normal manner of operation, to initiate reapplication of the brakes on the wheel within a certain length of time following the instant the wheel begins to decelerate in excess of said certain rate, and means automatically effective to initiate reapplication of the brakes on the wheel in the event of failure of the last said means to initiate reapplication of the brakes within said certain length of time.

12. In a vehicle brake control apparatus, control means for bringing about release of braking means on the vehicle that are operative to effect deceleration of a wheel on the vehicle, said control means including an electrical winding and being operative, upon energization of said winding, to initiate release of the braking means and being effective, in the normal manner of operation thereof, to initiate reapplication of the braking means at least a predetermined time after the initial energization of said winding, means responsive to slipping of the wheel in the course of deceleration thereof by the braking means and operative, upon slipping of the wheel, to close circuit to said winding to effect energization thereof, and safety means effective to initiate reapplication of the braking means in the event reapplication thereof is not initiated by said control means within a period of time that is greater than the aforesaid predetermined time.

13. In a vehicle brake control apparatus for use with braking means that effect a braking operation on a vehicle wheel so long as air under pressure is supplied through a pipe included in the braking means, control means for bringing about a release of the braking means while air under pressure is being supplied through said pipe, said control means including an electrical winding and being operative, upon energization of said winding, to initiate release of the braking means and being effective to initiate reapplication of the braking means, when air under pressure is being supplied through said pipe, within a certain length of time after the initial energization of said winding, means responsive to slipping of the vehicle wheel in the course of deceleration thereof by said braking means and operative, upon slipping of the wheel, to close circuit to said winding to effect energization thereof, and safety means operative to initiate reapplication of the braking means, when air under pressure is being supplied through said pipe, in the event reapplication thereof is not initiated by said control means within said certain length of time.

ROSSER L. WILSON.